United States Patent [19]
Mori et al.

[11] Patent Number: 5,602,592
[45] Date of Patent: Feb. 11, 1997

[54] MOVING PICTURE COMPRESSED SIGNAL CHANGEOVER APPARATUS

[75] Inventors: Toshiaki Mori, Minoo; Toshihiko Kurosaki, Kobe, both of Japan

[73] Assignee: Matsushita Electric Industrial Co., Ltd., Osaka, Japan

[21] Appl. No.: 371,870

[22] Filed: Jan. 12, 1995

[30]     Foreign Application Priority Data

Jan. 18, 1994 [JP] Japan .................................... 6-003460

[51] Int. Cl.⁶ .............................. H04N 7/50; H04N 5/268
[52] U.S. Cl. ......................... 348/415; 348/700; 348/705
[58] Field of Search .................................... 348/415, 700, 348/701, 705; H04N 7/50, 5/268

[56]          References Cited

U.S. PATENT DOCUMENTS

| 5,181,111 | 1/1993 | Hedley | 348/701 |
| 5,408,274 | 4/1995 | Chang | 348/700 |
| 5,471,239 | 11/1995 | Hill | 348/700 |

*Primary Examiner*—Howard W. Britton
*Attorney, Agent, or Firm*—Wenderoth, Lind & Ponack

[57]          ABSTRACT

A moving picture compressed signal changeover apparatus changes over from a first moving picture compressed signal containing intra-frame coded frames, forward prediction coded frames and bidirectional prediction coded frames to a second moving picture compressed signal containing intra-frame coded frames, forward prediction coded frames and bidirectional prediction coded frames such that a frame of the first moving picture compressed signal occurring just before an intra-frame coded frame or a forward prediction coded frame of the first moving picture compressed signal is connected to an intra-frame coded frame of the second moving picture compressed signal. A predetermined signal which is different from the first and second moving picture compressed signals may be inserted between the connected frames of the first and second moving picture compressed signals. Alternatively, at least one of the first and second moving picture compressed signals may be delayed so as to adjust a connecting timing.

13 Claims, 14 Drawing Sheets

MOVING PICTURE COMPRESSED SIGNAL CHANGEOVER APPARATUS

BACKGROUND OF THE INVENTION

1. Field of the Invention

The present invention relates to a moving picture compressed signal changeover apparatus for changing over and outputting plural input digital moving picture compressed signals.

2. Description of the Prior Art

In changeover of transmission video signals or video editing at a broadcasting station, a moving picture changeover apparatus is used. Video signals used at the present are generally analog signals, and output signals are changed over in a boundary of a frame or a field.

When digital signals are used as video signals, compressing and coding is effected to decrease the data quantity.

Methods of compressing and coding a moving picture are described below. The methods of compressing and coding a frame are roughly divided into two types. One is intra-frame coding without utilizing the correlation with other frames, in which the frame can be decoded only from the signal generated by compressing the same frame. The other is inter-frame predictive coding by making use of the correlation with other frames, in which the other frames used in coding must be used in decoding. Inter-frame predictive coding comprises forward predictive coding for making use of the correlation with a preceding picture, backward predictive coding for making use of correlation with succeeding picture, and bidirectional predictive coding for making use of both preceding and succeeding pictures. In a further different coding method, for example, a frame is divided into plural blocks, each block Is differently coded, and these blocks are combined.

In a case of output by changing over the compressed and coded moving picture, If a moving picture signal Is compressed only by intra-frame compressing and coding, by changing over in the boundary of frames, a normal moving picture is output as a reproduced picture even at the changeover point.

However, when changing over and outputting a moving picture slgnal compressed by utilizing the inter-frame correlation, the frame utilizing the correlation at the time of coding and the frame used in decoding may be different before and after the changeover point, so that a moving picture signal not reproduced normally at the changeover point is output.

SUMMARY OF THE INVENTION

It is hence a primary object of the invention to provide a moving plcture compressed signal changeover apparatus capable of changing over moving picture compressed signals each comprising a sequence of coded frames containing intra-frame coded frames, forward prediction coded frames and bidirectional prediction coded frames so that a reproduced picture which will be obtained by decoding the compressed signals will not be disturbed at the changeover point.

To achieve this object, a moving picture compressed signal changeover apparatus of the invention comprises: a first input means for receiving a first moving picture compressed signal comprising a sequence of coded frames containing intra-frame coded frames, forward prediction coded frames and bidirectional prediction coded frames; a second input means for receiving a second moving picture compressed signal comprising a sequence of coded frames containing intra-frame coded frames, forward prediction coded frames and bidirectional prediction coded frames; and a changeover means coupled to the first and second input means for selectively outputting one of the first and second moving picture compressed signals, the changeover means being responsive to an externally given changeover signal for changing over from the first moving picture compressed signal to the second moving picture compressed signal by connectlng a frame of the first moving picture compressed signal occurring just before an intra-frame coded frame or a forward prediction coded frame of the first moving picture compressed signal to an intra-frame coded frame of the second moving picture compressed signal.

In a preferred manner, the moving picture compressed signal changeover apparatus may further comprise a signal generating means for generating a predetermined signal different from the first and second moving picture compressed signals. In this case, the changeover means changes over from the first moving picture compressed slgnal to the second moving picture compressed signal by flrst connecting a frame of the flrst moving picture compressed signal occurring just before an intra-frame coded frame or a forward prediction coded frame of the first moving picture compressed signal to the predetermined signal and thereafter connecting the predetermined signal to an intra-frame coded frame of the second moving picture compressed signal. The predetermined signal may be either a signal which does not affect a decoding processing performed at a decoder for decoding the first and second moving picture compressed signals or a signal which shows that a frame occurring during occurrence of the predetermined signal has no difference from a previously occurring frame.

In another preferred manner, the moving picture compressed signal changeover apparatus may further comprise a first delay means coupled to the second input means for delaying the second moving picture compressed signal to obtain a delayed second moving picture compressed signal, a second delay means coupled to the second input means for delaying the second moving picture compressed signal to obtain a delayed second moving picture compressed signal, and a delay control means for controlling at least one of the first and second delay means. In this case, the changeover means may be coupled to the first and second delay means for selectively outputting one of the delayed first and second moving picture compressed signals, and responsive to the externally given changeover signal for changing over from the delayed first moving picture compressed signal to the delayed second moving picture compressed signal by connecting a frame of the delayed first moving picture compressed signal occurring Just before an intra-frame coded frame or a forward prediction coded frame of the delayed first moving picture compressed signal to an intra-frame coded frame of the delayed second moving picture compressed signal. The delay control means controls at least one of the first and second delay means such that the frame of the delayed first moving picture compressed signal occurring Just before an intra-frame coded frame or a forward prediction coded frame of the delayed first moving picture compressed signal occurs at a timing just before the intra-frame coded frame of the delayed second moving picture compressed signal.

In still another preferred manner, the moving picture compressed signal changeover apparatus may further comprise a decoding means coupled to the second input means for decoding the forward prediction coded frames in the first moving picture compressed signal to obtain decoded frames, and an intra-frame encoding means for intra-frame encoding each of the decoded frames to obtain a new intra-frame coded frame. In this case, the changeover means changes over from the first moving picture compressed signal to the second moving picture compressed signal by first connecting a frame of the first moving picture compressed signal occurring just before an intra-frame coded frame or a forward prediction coded frame of the first moving picture compressed signal to the new intra-frame coded frame and then connecting the new intra-frame coded frame to an intra-frame coded frame of the second moving picture compressed signal.

Also, two or more of the above preferred manners may be employed in proper combinations In one moving picture compressed signal changeover apparatus.

DESCRIPTION OF THE PREFERRED EMBODIMENTS

Figure 1:
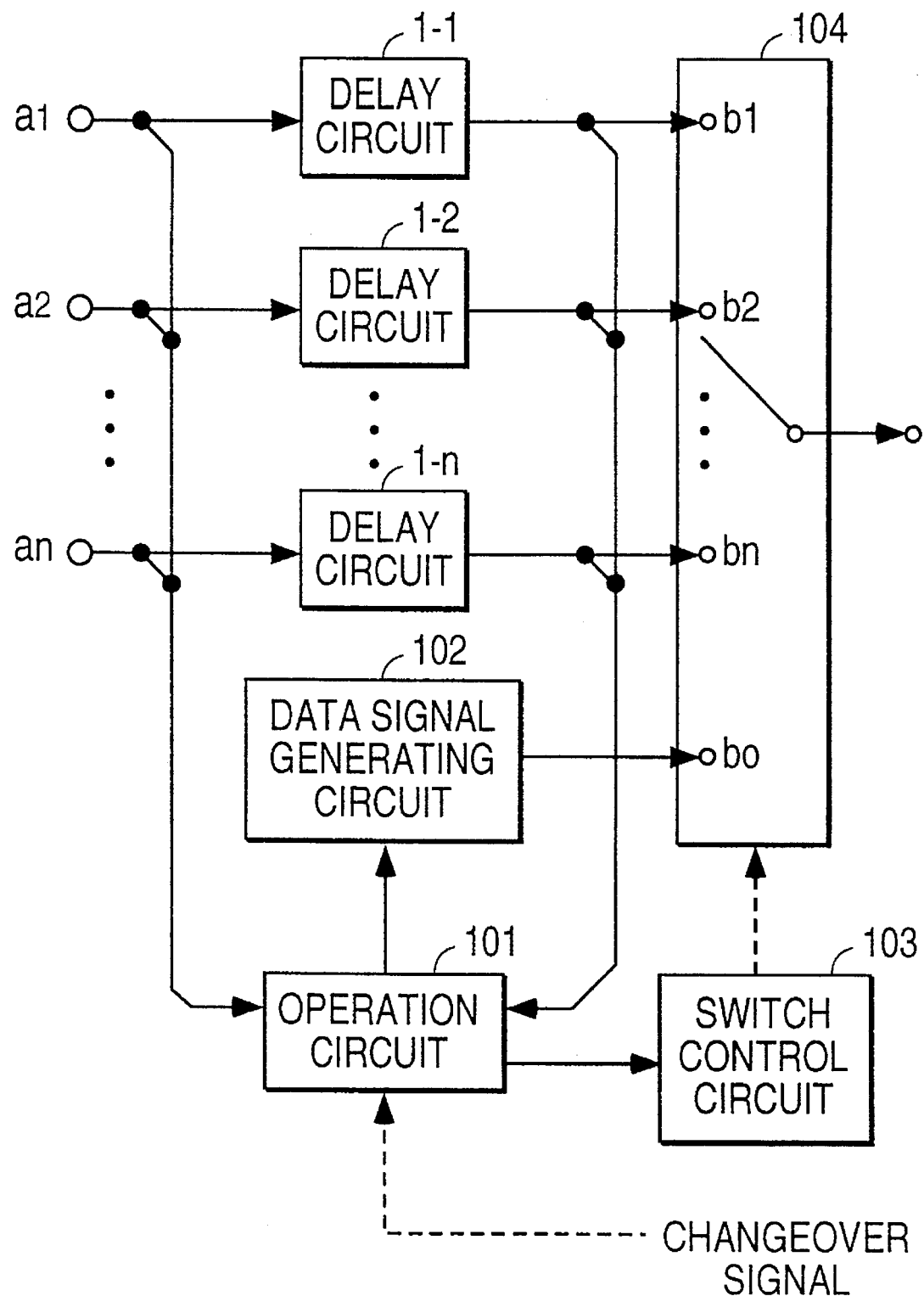
FIG. 1 is a block diagram of a moving picture compressed signal changeover apparatus in a first embodiment of the invention.

FIG. 1 is a block diagram of a moving picture compressed signal changeover apparatus in a first embodiment of the invention. Reference numerals 1—1, 1-2, . . . , 1-n (n being a natural number) denote delay circuits for delaying moving picture compressed signals entered from input terminals $a_1$, $a_2$, . . . , $a_n$ by a specific time, and outputting, the moving picture compressed signals to input terminals $b_1$, $b_2$, . . . , $b_n$ of a switch 104, respectively, and also to an operation circuit 101. In the operation circuit 101, the moving picture compressed signals entered from the input terminals $a_1$, to $a_n$ are also entered. The operation circuit 101 detects a boundary of each frame in the entered moving picture compressed signals, and calculates an output signal of a data signal generating circuit 102 and changeover operation and timing of the switch 104 on the basis of a changeover signal and the moving picture compressed signals, and sends out data signals to the data signal generating circuit 102 and a switch control circuit 103. The data signal generating circuit 102 outputs a signal not affecting decoding of the moving picture compressed signal to a terminal $b_0$ of the switch 104 on the basis of the data signals output by the operation circuit 101. The switch control circuit 103 controls the changeover operation of the switch 104 on the basis of the changeover operation and the timing calculated by the operation circuit 101. The switch 104 selects one of the signals entered through the input terminals $b_1$ to $b_n$ and $b_0$, and delivers the selected signal.

Figure 2:
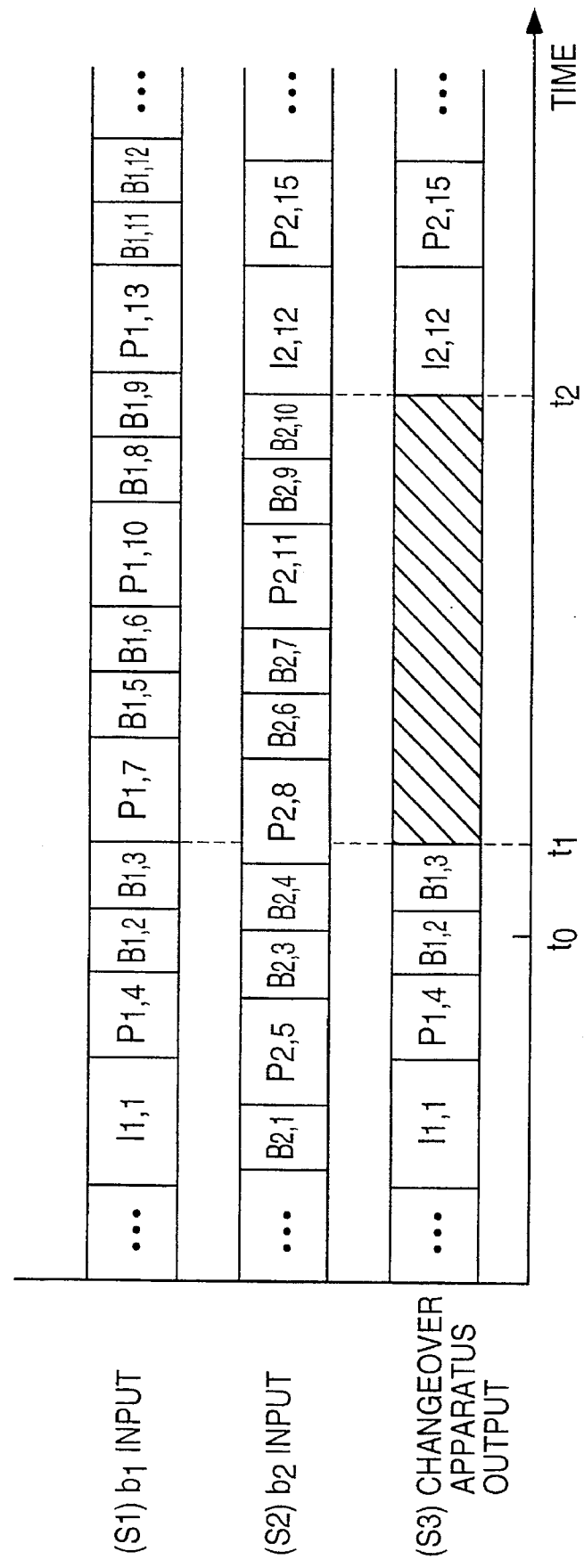
FIG. 2 is a diagram showing input and output signals of a switch of the moving picture compressed signal changeover apparatus In FIG. 1.

In thus constituted moving picture compressed signal changeover apparatus. the operation is described below. FIG. 2 shows input and output signals of the moving picture compressed signal changeover apparatus, plotting the time on the axis of abscissas, in order to explain the changeover operation of the switch 104 of the moving picture compressed signal changeover apparatus. As an example, herein, in order to explian the output of the moving picture compressed signal changeover apparatus the input and output signals of the switch 104 are shown at the time of changeover from the moving picture compressed signal entered into the input terminal $a_1$, to the moving picture compressed signal entered into the input terminal $a_2$, and the changeover operation of the switch 104 is described. In FIG. 2, $S_1$ denotes a moving picture compressed signal entered from the input terminal $a_1$ and output to the terminal $b_1$ of the switch 104 after passing through the delay circuit 1—1, $S_2$ denotes a moving picture compressed signal entered from the input terminal $a_2$ and output to the terminal $b_2$ of the switch 104 after passing through the delay circuit 1-2, and $S_3$ denotes a moving picture compressed signal output from the switch 104, that is, the output signal of the moving picture compressed signal changeover apparatus. In the diagram of FIG. 2, I denotes an intra-frame coded frame, P denotes a forward predictive coded frame, and B denotes a bidirectional predictive coded frame, and the first subscript refers to the identifier of the moving picture compressed signal, and the second subscript denotes the sequence of appearance of each frame. Shaded area expresses the output signal of the data signal generating circuit 102. Herein, the forward predictive coded frame is obtained by coding by making use of the correlation with the immediately preceding frame, and the bidirectional predictive coded frame is obtained by coding by making use of the correlation with the closest preceding and closest succeeding intra-frame coded frames, or the forward predictive coded frame.

Moreover, $t_o$ denotes time when the changeover signal is entered, and before this time, the switch 104 is connected to $b_1$. When the changeover signal is entered, the operation circuit 101 monitors that a next intra-frame coded frame or a next forward predictive coded frame is entered in the delay circuit 1—1, and that a next intra-frame coded frame is entered in the delay circuit 1-2. At this time, when the operation circuit 101 detects a boundary of a forward predictive coded frame $P_{1.7}$ and an immediately preceding frame $B_{1.3}$, the operation circuit 101 monitors that this boundary is entered in the terminal $b_1$ of the switch 104. At time $t_1$, when it is detected that the preceding frame immediately before the boundary is entered In the terminal $b_1$, the switch 104 is changed over from $b_1$ to $b_0$, and the switch 104 outputs a signal not affecting the coding of the moving picture compressed signal and produced from the data signal generating circuit 102. In succession, when the operation circuit 101 detects a boundary of the intra-frame coded frame $I_{2.12}$ and an immediately preceding frame $B_{2.10}$, the operation circuit 101 monitors that the boundary is entered in the terminal $b_2$ of the switch 104. At time $t_2$, when It is detected that the preceding frame immediately before the boundary is entered in the terminal $b_2$, the switch 104 Is changed over from $b_0$ to $b_2$. As a result of such changeover, the output of the moving picture compressed signal changeover apparatus becomes $S_3$.

In this changeover procedure, since frames $B_{1.2}$ and $B_{1.3}$ are output before the changeover, in the moving picture compressed signal changeover apparatus of the invention, frames are reproduced without being omitted up to the changeover point. After the changeover, since a frame $I_{2.12}$ is intra-frame coded, it is normally decoded, and in the subsequent compressed picture, since the correlated frame $I_{2.12}$ is normally decoded, it Is decoded normally. At this time, the signal not affecting the decoding of the moving picture compressed signal is inserted, and there is no effect on reproduction of the preceding and succeeding compressed pictures. Therefore, it is possible to change over the moving picture compressed signal wlthout disturbing the reproduced picture at the changeover point at the time of decoding.

Figure 3:
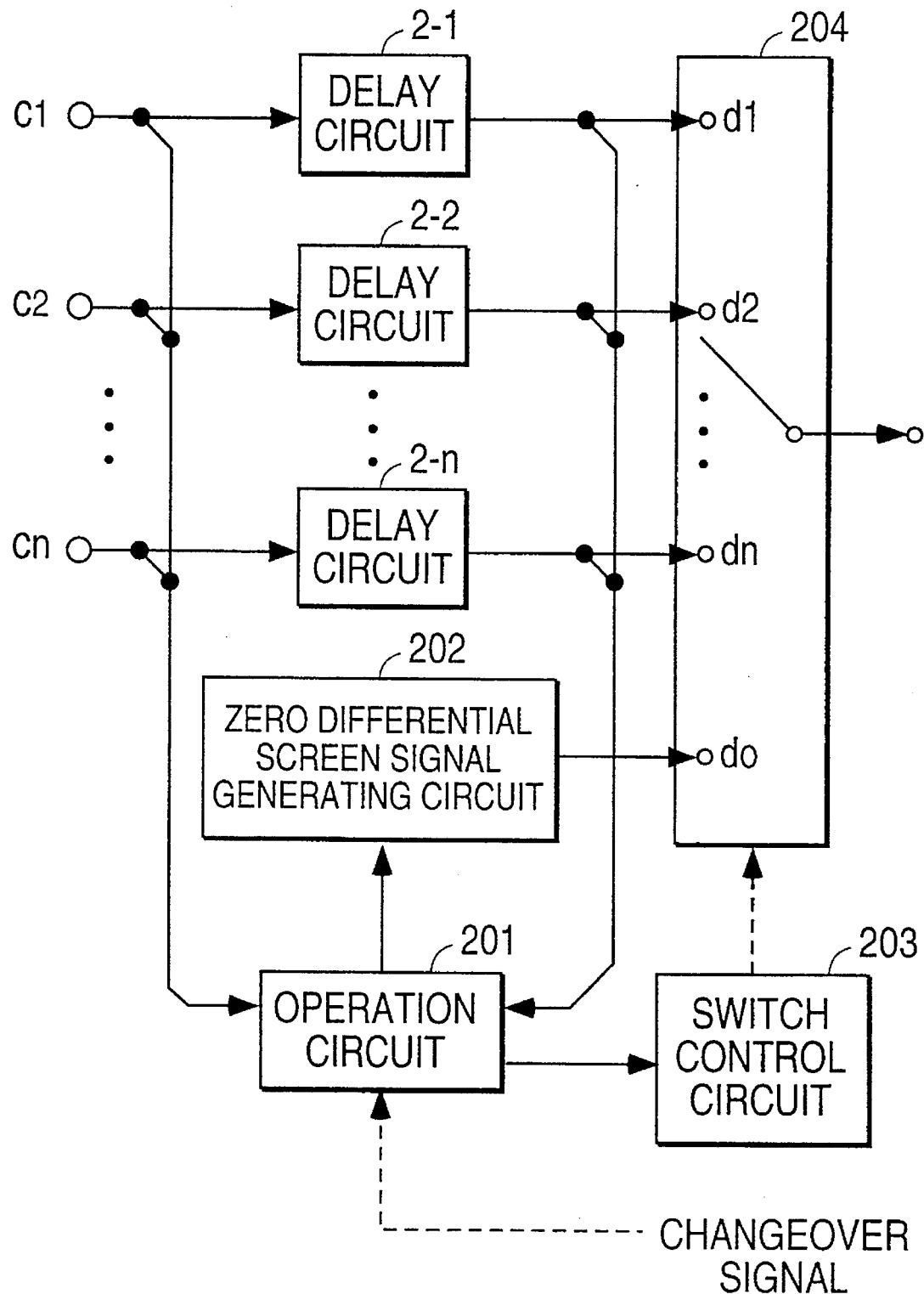
FIG. 3 is a block diagram of a moving picture compressed signal changeover apparatus in a second embodiment of the invention.

FIG. 3 is a block diagram of a moving picture compressed signal changeover apparatus in a second embodiment of the invention. Reference numerals 2-1, 2—2, . . . , 2-n denote delay circuits for delaying moving picture compressed signals entered from input terminals $c_1, c_2, \ldots, c_n$ by a specific time, and outputting the moving picture compressed signals to input terminals $d_1, d_2, \ldots, d_n$, of a switch 204, respectively, and also to an operation circuit 201. In the operation circuit 201, the moving picture compressed signals entered from the input terminals $c_1$ to $c_n$ are also entered. The operation circuit 201 detects a boundary of each frame in the entered moving picture compressed signals, and calculates an output signal of a zero differential picture signal generating circuit 202 and changeover operation and timing of the switch 204 on the basis of a changeover signal and moving picture compressed signals, and sends out control signals to the zero differential picture signal generating circuit 202 and a switch control circuit 203. The zero differential picture signal generating circuit 202 outputs a signal of a predictive coded frame showing that there is no difference from a previous reproduced frame to a terminal $d_0$ of the switch 204 on the basis of the data signals output by the operation circuit 201. The switch control circuit 203 controls the changeover operation of the switch 204 on the basis of the changeover operation and the timing calculated by the operation circuit 201. The switch 204 selects one of the signals entered through the input terminals $d_1$ to $d_n$ and $d_0$, and delivers the selected signal.

Figure 4:
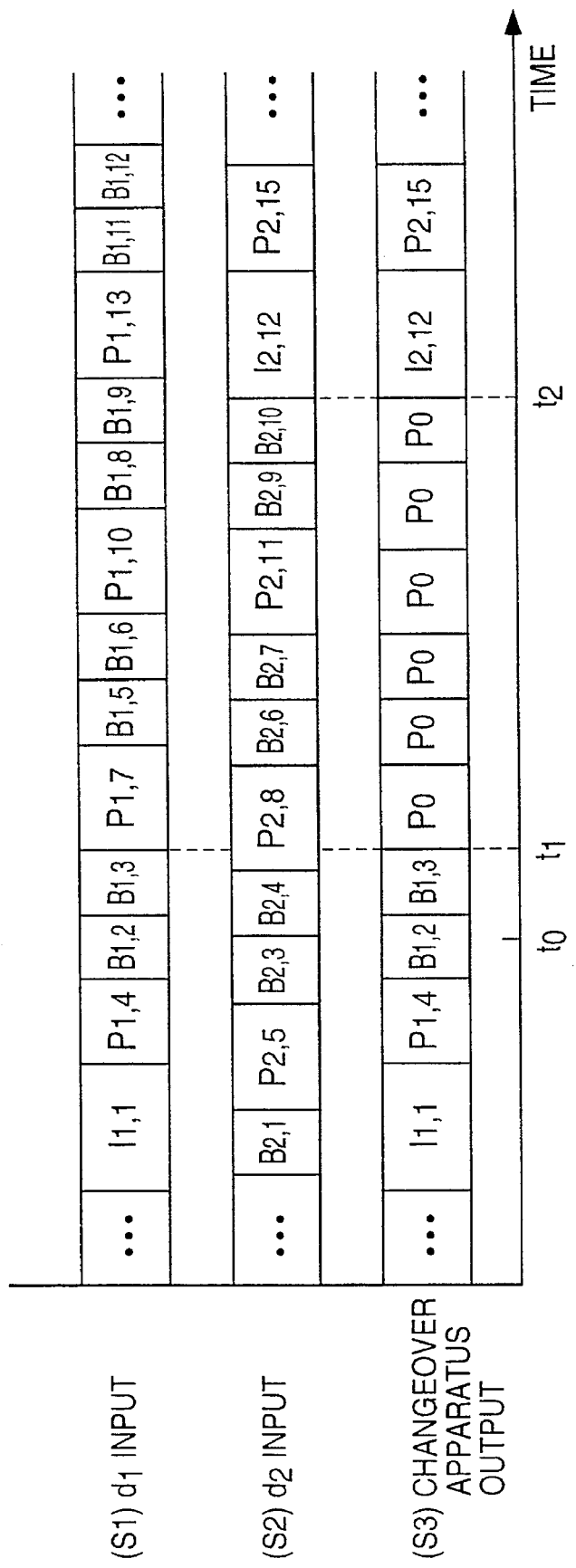
FIG. 4 is a diagram showing input and output signals of a switch of the moving picture compressed signal changeover apparatus in FIG. 3.

In thus constituted moving picture compressed signal changeover apparatus, the operation is described below. FIG. 4 shows the input and output signals of the moving picture compressed signal changeover apparatus, plotting the time on the axis of abscissas, in order to explain the changeover operation of the switch 204 of the moving picture compressed signal changeover apparatus. As an example, herein, in order to explain the output of the moving picture compressed signal changeover apparatus the input and output signals of the switch 204 are shown at the time of changeover from the moving picture compressed signal entered into the input terminal $c_1$ to the moving picture compressed signal entered into the input terminal $c_2$, and the changeover operation of the switch 204 is described. In FIG. 4, $S_1$ denotes a moving picture compressed signal entered from the input terminal $c_1$ and output to the terminal $d_1$ of the switch 204 after passing through the delay circuit 2-1, $S_2$ denotes a moving picture compressed signal entered from the input terminal $c_2$ and output to the terminal $d_2$ of the switch 204 after passing through the delay circuit 2—2, and $S_3$ denotes a moving picture compressed signal output from the switch 204, that is, the output signal of the moving picture compressed signal changeover apparatus. In the diagram of FIG. 4, $P_0$ denotes a predictive coded frame showing there is no difference from the preceding frame, which is an output of the zero differential picture signal generatng circuit 202. The other frames and coding method are same as in FIG. 2.

Moreover, $t_0$ denotes time when the changeover signal is entered. Before this time, the switch 204 is connected to $d_1$. When the changeover signal is entered, the operation circuit 201 monitors that a next intra-frame coded frame or a next forward predictive coded frame is entered in the delay circuit 2-1, and that a next intra-frame coded frame is entered in the delay circuit 2—2. At this time, when the operation circuit 201 detects a boundary of a forward predictive coded frame $P_{1.7}$ and an immediately preceding frame $B_{1.3}$, the operation circuit 201 monitors that this boundary is entered in the terminal $d_1$ of the switch 204. At time $t_1$, when it is detected that the preceding frame immediately before the boundary is entered in the terminal $d_1$, the switch 204 Is changed over from $d_1$ to $d_0$, and the predictive coded frame $P_0$ showing there is not difference from the previous frame as being delivered from the zero differential picture signal generating circuit 202 is output from the switch 204. In succession, when the operation circuit 201 detects a boundary of the intra-frame coded frame $I_{2.12}$ and an immediately preceding frame $B_{2.10}$, the operation circuit 201 monitors that the boundary is entered in the terminal $d_2$ of the switch 204. At time $t_2$, when it is detected that the preceding frame immediately before the boundary is entered in the terminal $d_2$, the switch 204 is changed over from $d_0$ to $d_2$. As a result of such changeover, the output of the moving picture compressed signal changeover apparatus becomes $S_3$.

In this changeover procedure, since frame $B_{1.2}$ and $B_{1.3}$ are output before the changeover, in the moving picture compressed signal changeover apparatus of the invention, frames are reproduced without being omitted up to the changeover point. Besides, since the predictive coded frame showing there is no difference from the preceding frame is inserted later, a frame $P_{1.4}$ which is a reproduced frame immediately before changeover is reproduced sequentially. After the changeover, since a frame $I_{2.12}$ is intra-frame coded, it is normally decoded, and in the subsequent compressed picture, since the correlated frame $I_{2.12}$ is normally decoded, it is decoded normally. Therefore, it is possible to change over the moving picture compressed signal without disturbing the reproduced frame at the changeover point at the time of decoding.

Figure 5:
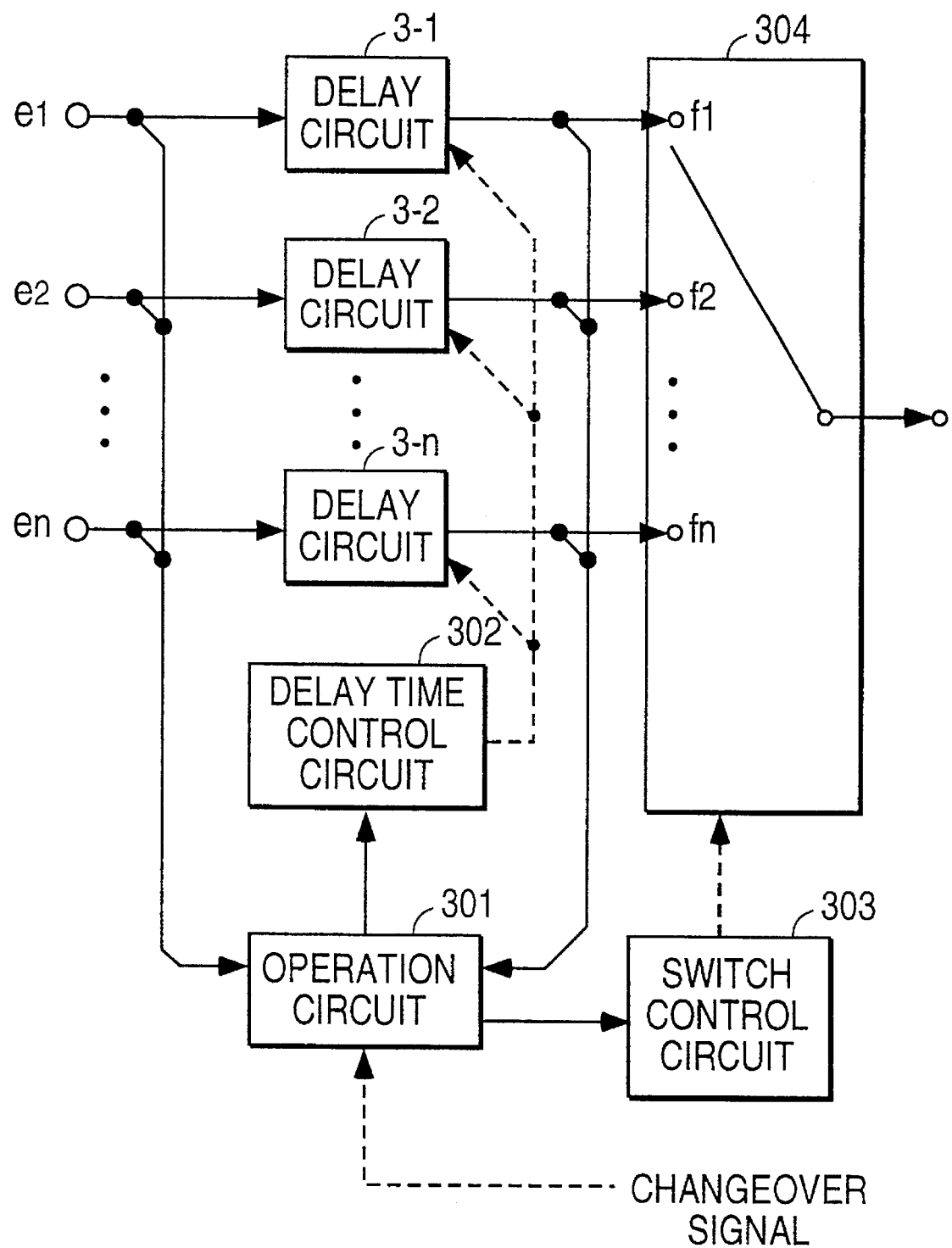
FIG. 5 is a block diagram of a moving picture compressed signal changeover apparatus in a third embodiment of the invention.

FIG. 5 is a block diagram of a moving picture compressed signal changeover apparatus in a third embodiment of the invention. Reference numerals 3-1, 3-2, . . . , 3-n denote delay circuits, which can change delay times by external control, for delaying moving picture compressed signals entered from input terminals $e_1, e_2, \ldots, e_n$ by a specific time, and outputting the moving picture compressed signals to Input terminals $f_x, f_2, \ldots, f_n$ of a switch 304, respectively, and also to an operation circuit 301. In the operation circuit 301, the moving picture compressed signals entered from the input terminals $e_1$ to $e_n$ are also entered. The operation circuit 301 detects a boundary of each frame in the entered moving picture compressed signals, and calculates the delay times of the delay circuits 3-1 to 3-n and changeover operation and timing of the switch 304 on the basis of a changeover signal and moving picture compressed signals, and sends out control signals to a delay time control circuit 302 and a switch control circuit 303. The delay time control circutt 302 controls the delay times of the delay circuits 3-1 to 3-n on the basis of the delay times calculated by the operation circuit 301. The switch control circuit 303 controls the changeover operation of the switch 304 on the basis of the changeover operation and the timing calculated by the operation circuit 301. The switch 304 selects one of the signals entered through the input terminals $f_1$ to $f_n$, and delivers the selected signal.

Figure 6:
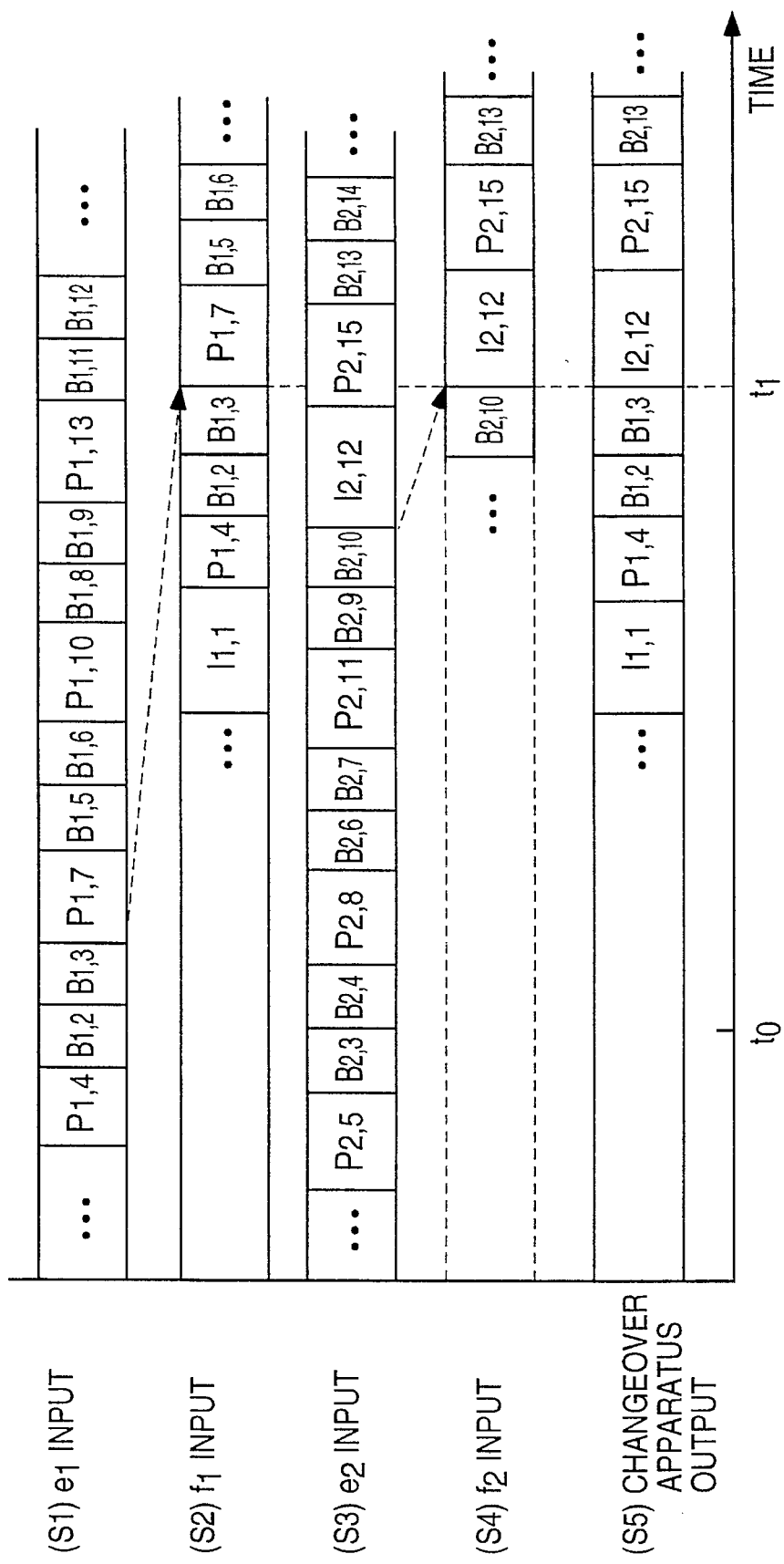
FIG. 6 is a diagram showing input and output signals of a switch of the moving picture compressed signal changeover apparatus in FIG. 5.

In thus constituted moving picture compressed signal changeover apparatus, the operation is described below. FIG. 6 shows the input and output signals of the moving picture compressed signal changeover apparatus, plotting the time on the axis of abscissas, in order to explain the changeover operation of the switch 304 of the moving picture compressed signal changeover apparatus. As an example, herein, in order to explain the output of the moving picture compressed signal changeover apparatus the input and output signals of the switch 304 are shown at the time of changeover from the moving picture compressed signal entered into the input terminal $e_1$ to the moving picture compressed signal entered into the input terminal $e_2$, and the changeover operation of the switch 304 is described. In FIG. 6, $S_1$ denotes a moving picture compressed signal entered from the input terminal $e_1$, $S_2$ denotes a moving picture compressed signal entered from the input terminal $e_1$ and output to the terminal $f_1$ of the switch 304 after passing through the delay circuit 3-1, $S_3$ denotes a moving picture compressed signal entered from the input terminal $e_2$, $S_4$ denotes a moving picture compressed signal after input of changeover signal entered from the input terminal $e_2$ and output into the terminal $f_2$ of the switch 304 after passing through the delay circuit 3-2, and $S_5$ denotes a moving picture compressed signal delivered from the switch 304, that is, an output signal of the moving picture compressed signal changeover apparatus. The frames and coding method in the diagram of FIG. 6 are same as in FIG. 2.

Moreover, $t_0$ denotes time when the changeover signal is entered. Before this time, the switch 304 is connected to $f_1$. When the changeover signal is entered, the operation circuit 301 monitors that a next intra-frame coded frame or a next forward predictive coded frame is entered in the delay circuit 3-1. At this time, when the operation circuit 301 detects a boundary of a forward predictive coded frame $P_{1,7}$ and an immediately preceding frame $B_{1,3}$, a delay time of the delay circuit 3-2 is calculated so that a beginning signal of a next infra-frame coded frame $I_{2,12}$ of the moving picture compressed signal delivered from the delay circuit 3-2 may be entered In the switch 304 simultaneously with a beginning signal of a frame $P_{1,7}$, and the delay time is output into the delay time control circuit 302. The delay time control circuit 302 controls the delay time of the delay circuit 3-2 so as to operate on the delay time calculated by the operation circuit 301. Then monitoring that a boundary of the frame $B_{1,3}$ and the frame $P_{1,7}$ is entered in the terminal $f_1$ of the switch 304, at time $t_1$, when it is detected that a signal immediately before the boundary is entered in the terminal $f_1$, the switch 304 is changed over from the terminal $f_1$ to the terminal $f_2$. As a result of the changeover, the output of the moving pcture compressed slgnal changeover apparatus becomes $S_5$.

In this changeover procedure, since the frame $B_{1,2}$ and the frame $B_{1,3}$ are output before the changeover; in the moving picture compressed signal changeover apparatus of the invention, frames are reproduced without being omitted up to the changeover point. After the changeover, since the frame $I_{2,12}$ is intra-frame coded, It is normally decoded, and in the subsequent compressed picture, since the correlated frame $I_{2,12}$ is normally decoded, it is decoded normally. Therefore, it is posslble to change over the moving picture compressed signal without disturbing the reproduced frame at the changeover point at the time of decoding.

Figure 7:
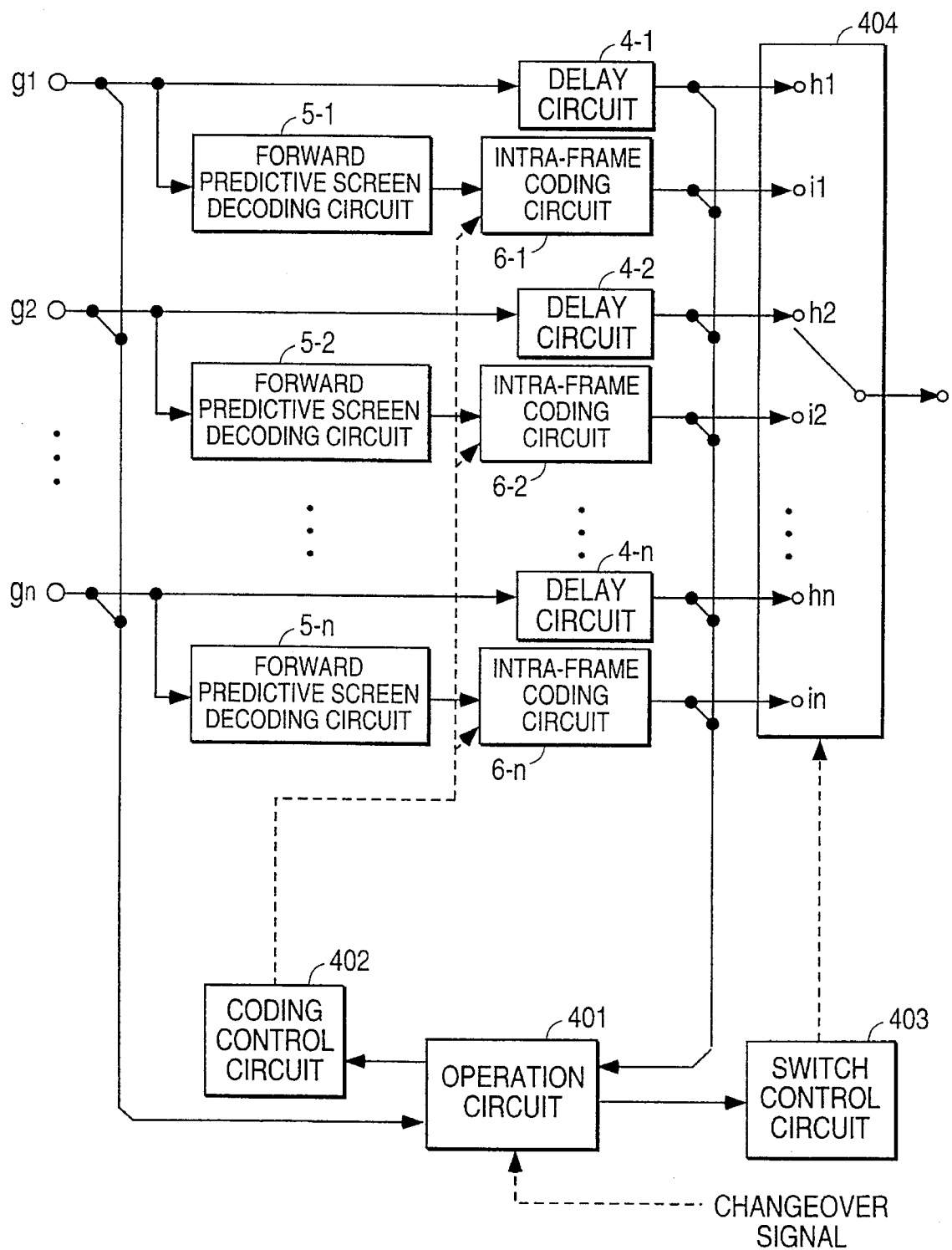
FIG. 7 is a block diagram of a moving picture compressed signal changeover apparatus in a fourth embodiment of the invention.

FIG. 7 is a block diagram of a moving picture compressed signal changeover apparatus in a fourth embodiment of the invention. Reference numerals 4-1, 4-2, . . . , 4-n denote delay circuits for delaying moving picture compressed signals entered from input terminals $g_1, g_2, \ldots, g_n$ by a specific time, and outputting the moving picture compressed signals to input terminals $h_1, h_2, \ldots, h_n$ of a switch 404, respectively, and also to an operation circuit 401. In the operation circuit 401, the moving picture compressed signals entered from the input terminals $g_1$ to $g_n$ are also entered. Reference numerals 5-1, 5-2, . . . , 5-n denote forward predictive frame decoding circuits for decoding only forward predictive frame of the moving picture compressed signals entered respectively from the input terminals $g_1, g_2, \ldots, g_n$ into picture signals, and sending out picture signals into intra-frame coding circuits 6-1, 6-2, . . . , 6-n, respectively The intra-frame coding circuits 6-1, 6-2, . . . , 6-n are to process the picture signals entered from the forward predictive frame decoding circuits 5-1, 5-2, . . . , 5-n by intra-frame coding, and send out to terminals $i_1, i_2, \ldots, i_n$ of the switch 404, respectively. The operation circuit 401 detects a boundary of each frame in the entered moving picture compressed signals, and calculates the coding compresslon rate of pictures of the infra-frame coding circuits 6-1 to 6-n, and changeover operation and timing of the switch 404 on the basis of the input changeover signal and moving picture compressed signals, and sends out the control signals to a coding control circuit 402 and a switch control clicult 403. The coding control circuit 402 is to control the compression rate of intra-frame coding by the intra-frame coding circuits 6-1 to 6-n on the basis of the data calculated by the operation circult 401. The switch control circuit 403 is to control the changeover operation of the switch 404 on the basis of the changeover operation and timing calculated by the operation circuit 401. The switch 404 selects one of the signals entered through the input terminals $h_1$ to $h_n$ and $i_n$, and delivers the selected signal.

Figure 8:
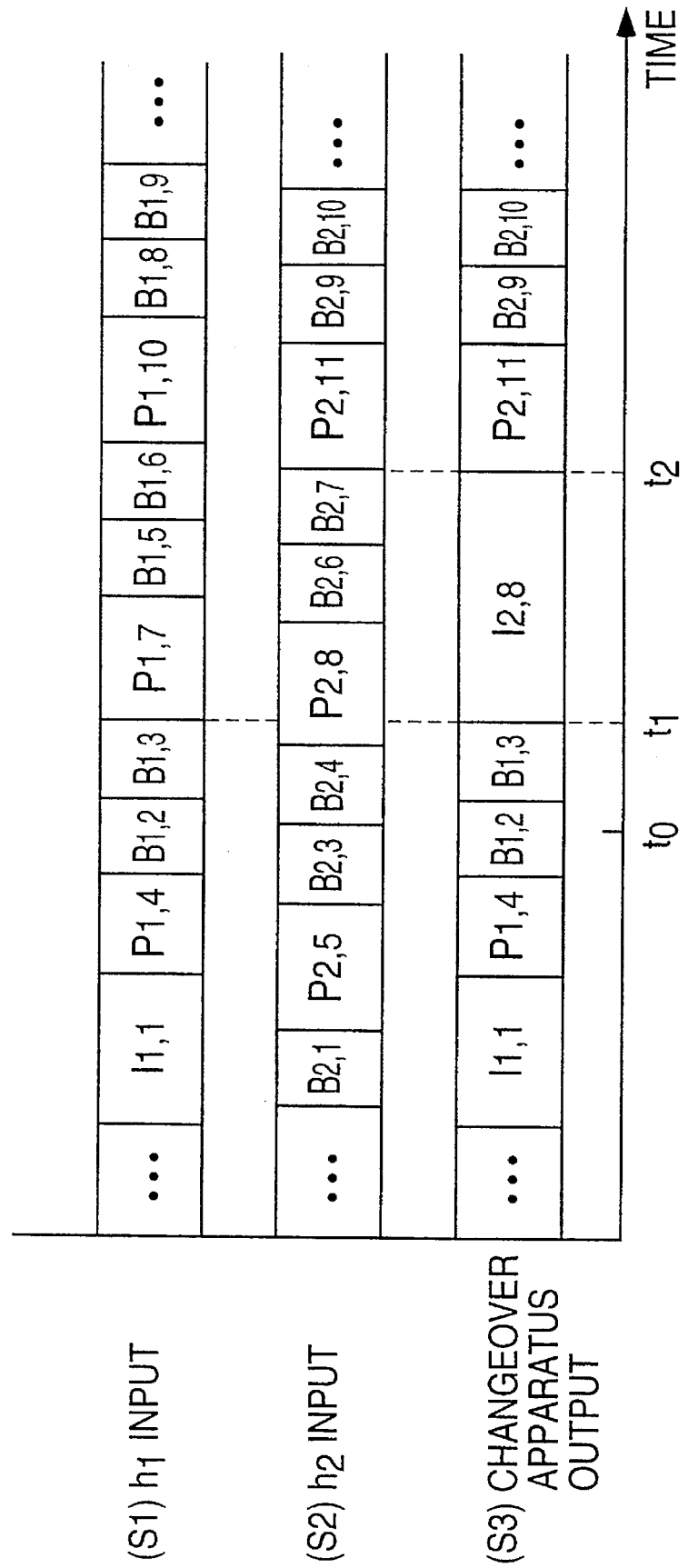
FIG. 8 is a diagram showing input and output signals of a switch of the moving picture compressed signal changeover apparatus In FIG. 7.

In thus constituted moving picture compressed signal changeover apparatus, the operation is described below. FIG. 8 shows the input and output signals of the moving picture compressed signal changeover apparatus, plottlng the time on the axis of abscissas. in order to explain the changeover operation of the switch 404 of the moving picture compressed signal changeover apparatus. As an example, herein, in order to explain the output of the moving picture compressed signal changeover apparatus the input and output signals of the switch 404 are shown at the time of changeover from the moving picture compressed signal entered Into the input terminal $g_1$ to the moving picture compressed signal entered into the input terminal $g_2$, and the changeover operation of the switch 404 is described. In FIG. 8, $S_1$ denotes a moving picture compressed signal entered from the input terminal $g_1$ and put into the terminal $h_1$ of the switch 404 after passing through the delay circuit 4-1, $S_2$ denotes a moving picture compressed signal entered from the input terminal $g_2$ and output to the terminal $h_2$ of the switch 404 after passing through the delay circuit 4-2, and $S_3$ denotes a moving picture compressed signal delivered from the switch 404, that is, an output signal of the moving picture compressed signal changeover apparatus. The frames and coding method in the diagram of FIG. 8 are same as in FIG. 2.

Moreover, $t_0$ denotes time when the changeover signal is entered. Before this time, the switch 404 is connected to $h_1$. When the changeover signal is entered, the operation circuit 401 monitors that a next intra-frame coded frame or a next forward predictive coded frame is entered in the delay circuits 4-1 and 4-2. At this time, when the operation circuit 401 detects a boundary of a forward predictive coded frame $P_{1.7}$ and an immediately preceding frame $B_{1.3}$, it is then monitored that the boundary is entered in the terminal $h_1$ of the switch 404. At time $t_1$, when it is detected that the signal immediately before the boundary is entered in the terminal $h_1$, the switch 404 is changed over from $h_1$ to $i_2$, and a frame $I_{2.8}$ re-coded $P_{2.8}$ into the intra-frame coded frame delivered by the intra-frame coding circuit 6-2 is put out from the switch 404. In succession, when the operation circuit 401 detects the boundary of the forward predictive coded frame $P_{2.11}$ and the picture $B_{2.7}$ immediately before it, it is monitored that the boundary is entered in the terminal $h_2$ of the switch 404. Then, at time $t_2$ when it is detected that the signal immediately before the boundary is entered in the terminal $h_2$, the switch 404 is changed over from $i_2$ to $h_2$. As a result of the changeover, the output of the moving picture compressed signal changeover apparatus becomes $S_3$.

Herein, when changing over the switch 404 from $i_2$ to $h_2$, in order that the final signal of the intra-frame coded frame $I_{2.8}$ delivered by the intra-frame coding circuit 6-2 may be delivered immediately before the changeover, the operation circuit 401 adjusts the coding compression rate of the intra-frame coding circuit 6-2. Accordingly, on the basis of this coding compression rate, the inrta-frame coding circuit 6-2 encodes the frame $P_{2.8}$ into the frame $I_{2.8}$.

In this changeover procedure, since a frame $B_{1.2}$ and a frame $B_{1.3}$ are put out before changeover, in the apparatus for decoding the output signal of the moving picture compressed signal changeover apparatus of the invention, the frame is reproduced wlthout being omitted up to the changeover point. After the changeover, since the frame $I_{2.8}$ is intra-frame coded, it is normally decoded, and in frames $P_{2.11}$, $B_{2.9}$ and $B_{2.10}$, since the correlated frame $I_{2.12}$ is normally decoded, it is decoded normally. Therefore, it is possible to change over the moving picture compressed signal without disturbing frames at the changeover point at the time of decoding.

Figure 9:
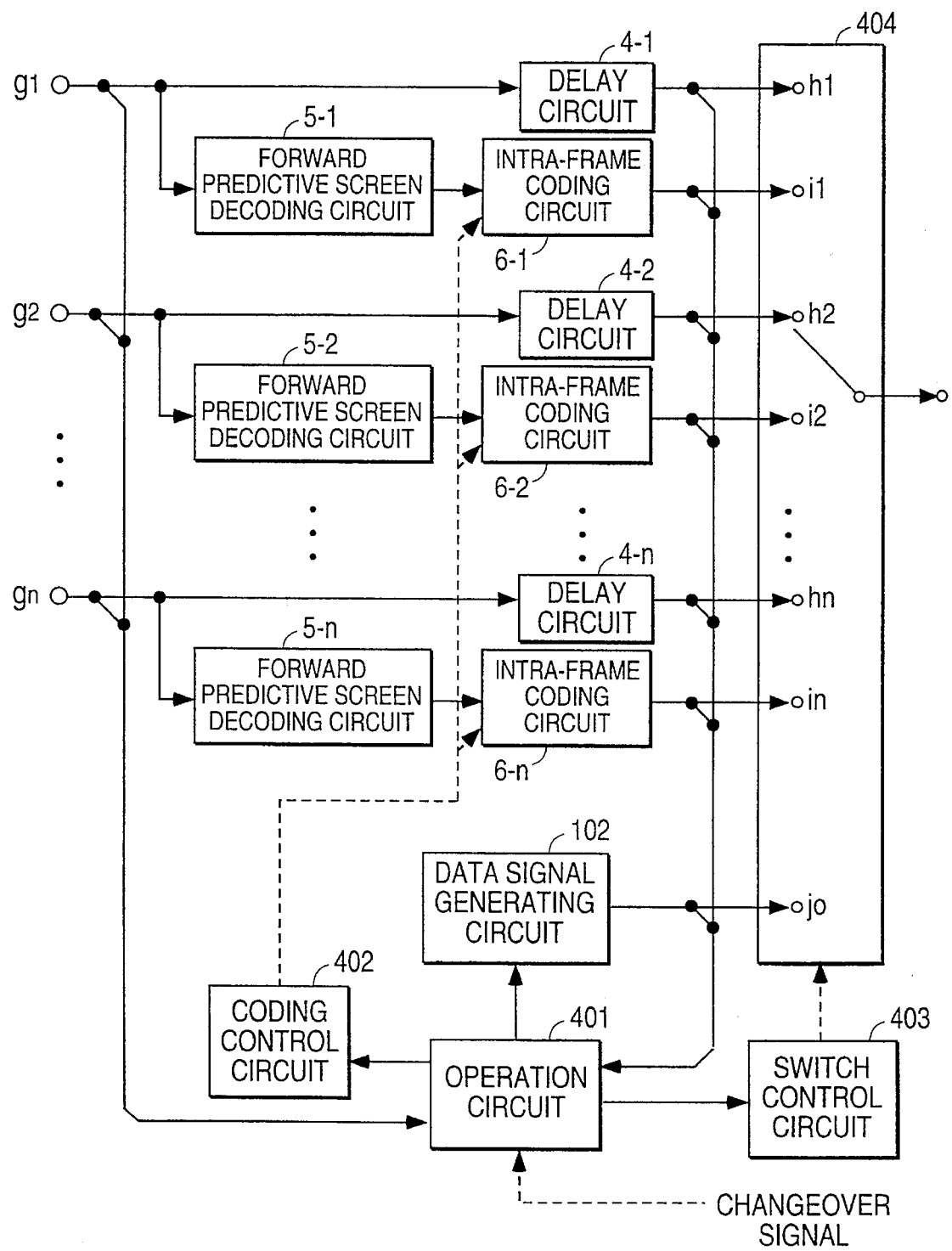
FIG. 9 is a block diagram of a moving picture compressed signal changeover apparatus in a fifth embodiment of the invention.

FIG. 9 ls a block diagram of a moving picture compressed signal changeover apparatus in a fifth embodiment of the invention by adding the data signal generating circuit 102 in the moving picture compressed signal changeover device in FIG. 1 to the moving picture compressed signal changeover apparatus shown in FIG. 7 and connecting the output to terminal $j_0$ added to the switch 404 so that the operation circuit 401 can calculate the output signal of the data signal generating circuit 102. Herein, the switch 404 selects one of the signals entered from the input terminals $h_1$ to $h_n$, $i_n$, and $j_0$, and delivers.

Figure 10:
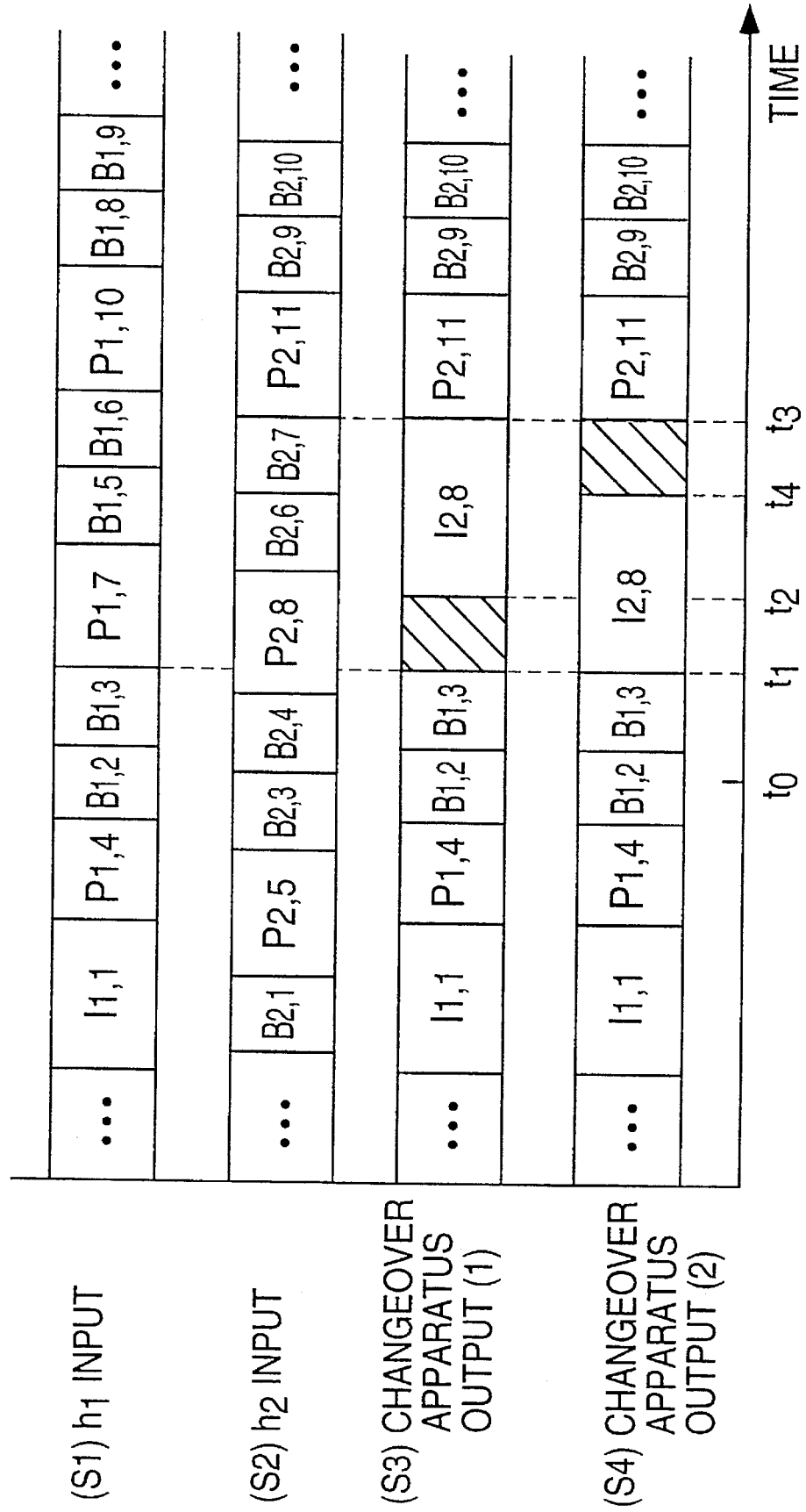
FIG. 10 is a diagram showing input and output signals of a switch of the moving picture compressed signal changeover apparatus in FIG. 9.

The operation of the moving picture compressed signal changeover apparatus in FIG. 9 is described. FIG. 10 shows the input and output signals of the moving picture compressed signal changeover apparatus, plotting the time on the axis of abscissas, in order to explain the changeover operation of the switch 404 of the moving picture compressed signal changeover apparatus. As an example, herein, in order to explain the output of the moving picture compressed signal changeover apparatus the input and output signals of the switch 404 are shown at the time of changeover from the moving picture compressed signal entered into the input terminal $g_1$ to the moving picture compressed signal entered into the input terminal $g_2$, and the changeover operation of the switch 404 is described. In FIG. 10, $S_1$ denotes a moving picture compressed signal entered from the input terminal $g_1$ and put into the terminal $h_1$ of the switch 404 after passing through the delay circuit 4-1, $S_2$ denotes a moving picture compressed signal entered from the input terminal $g_2$ and output to the terminal $h_2$ of the switch 404 after passing through the delay circuit 4-2, and $S_3$ and $S_4$ denote moving picture compressed signals delivered from the switch 404, that is, the output signals of the moving picture compressed signal changeover apparatus. The frames and coding method In the diagram in FIG. 10 are same as In FIG. 2.

In this embodiment, first of all, the switch 404 is changed over from $h_1$ to $j_0$ at time $t_1$ when the signal immediately before the forward predictive coded frame $P_{1.7}$ is entered in terminal $h_1$, and the switch 404 delivers a signal not affecting the decoding of the moving picture compressed signal delivered by the data signal generating circuit 102. Consequently, the switch 404 is changed over from $j_0$ to $i_2$ at time $t_2$ when the intra-frame coding circuit 6-2 delivers $I_{2.8}$ which is coded from $P_{2.8}$ onto the intra-frame coded frame, and a frame $I_{2.8}$ is delivered from the switch 404. In succession, the switch 404 is changed over from $i_2$ to $h_2$ at time $t_3$ when the signal immediately before a boundary of a forward predictive coded frame $P_{2.11}$ is entered in the terminal $h_2$. As a result of this changeover, an output of the moving picture compressed signal changeover apparatus becomes $S_3$.

Or, at time $t_1$, by changing over the switch 404 from $h_1$ to $i_2$ to deliver the frame $I_{2.8}$ from the switch 404, and after changing over the switch 404 from $i_2$ to $j_0$ at time $t_4$ when the frame $I_{2.8}$ is entered into $i_2$ of the switch 404, the switch 404 may be changed over from $j_0$ to $h_2$ at time $t_3$. In this case, the output of the moving picture compressed signal changeover apparatus becomes $S_4$.

According to this changeover procedure, frames are reproduced after changeover earlier than in the moving picture compressed signal changeover apparatus shown in FIG. 1. Or, as compared with the moving picture compressed signal changeover apparatus shown in FIG. 7, since the quantity of data of the intra-frame coded frame delivered after changeover is not fixed, strict control of coding compression rate on the intra-frame coding circuit is not necessary.

Figure 11:
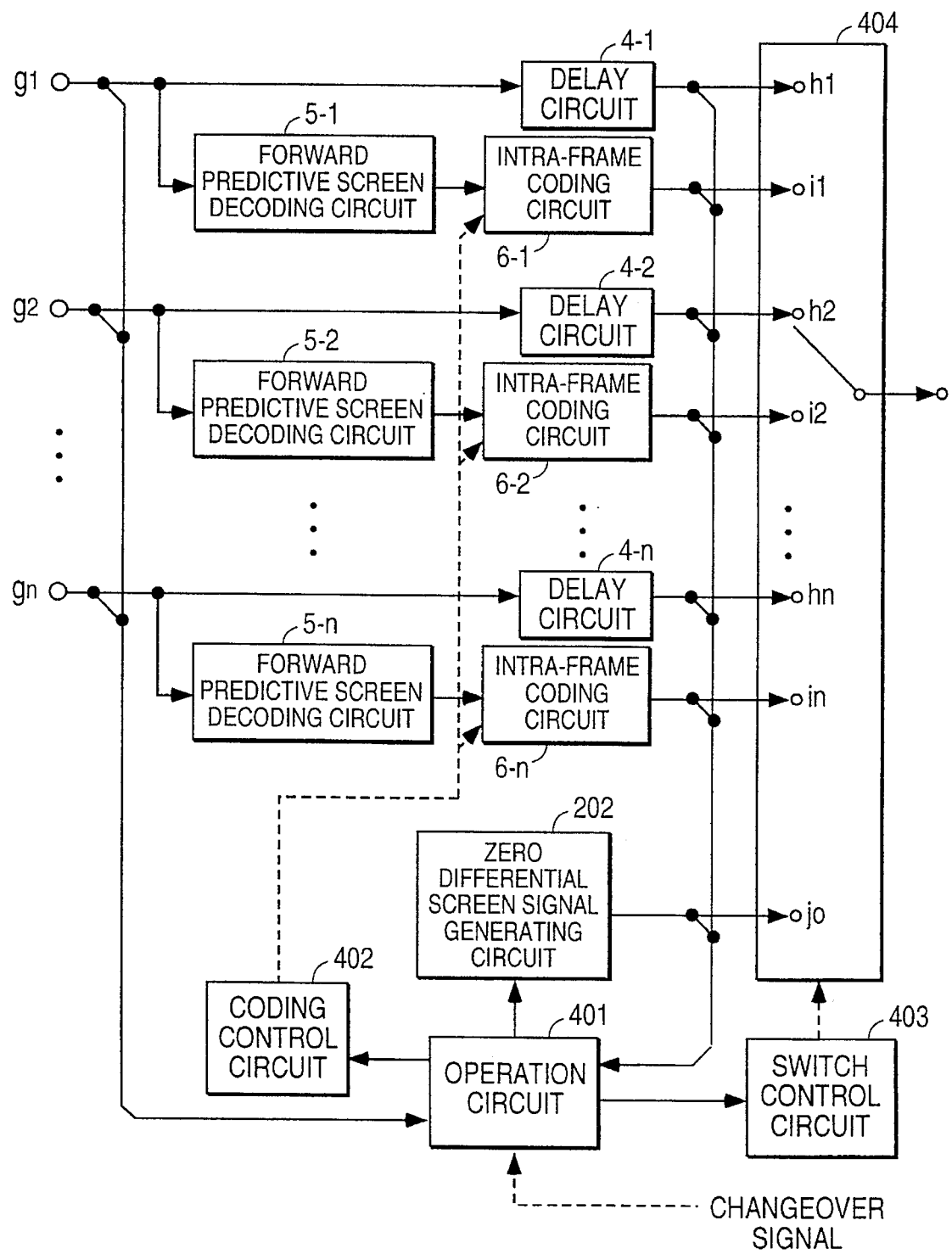
FIG. 11 is a block diagram of a moving picture compressed signal changeover apparatus in a sixth embodiment of the invention.

FIG. 11 is a block diagram of a moving picture compressed signal changeover apparatus in a sixth embodiment of the invention by adding the zero differential frame signal generating circuit 202 in the moving picture compressed signal changeover apparatus in FIG. 3 to the moving picture compressed signal changeover device shown in FIG. 7 and connecting the output to terminal $j_0$ added to the switch 404 so that the operation circuit 401 can calculate the output signal of the zero differential frame signal generating circuit 202. Herein. the switch 404 selects one of the signals entered from the input terminals $h_1$ to $h_n$, to $i_n$, and $j_0$, and delivers.

Figure 12:
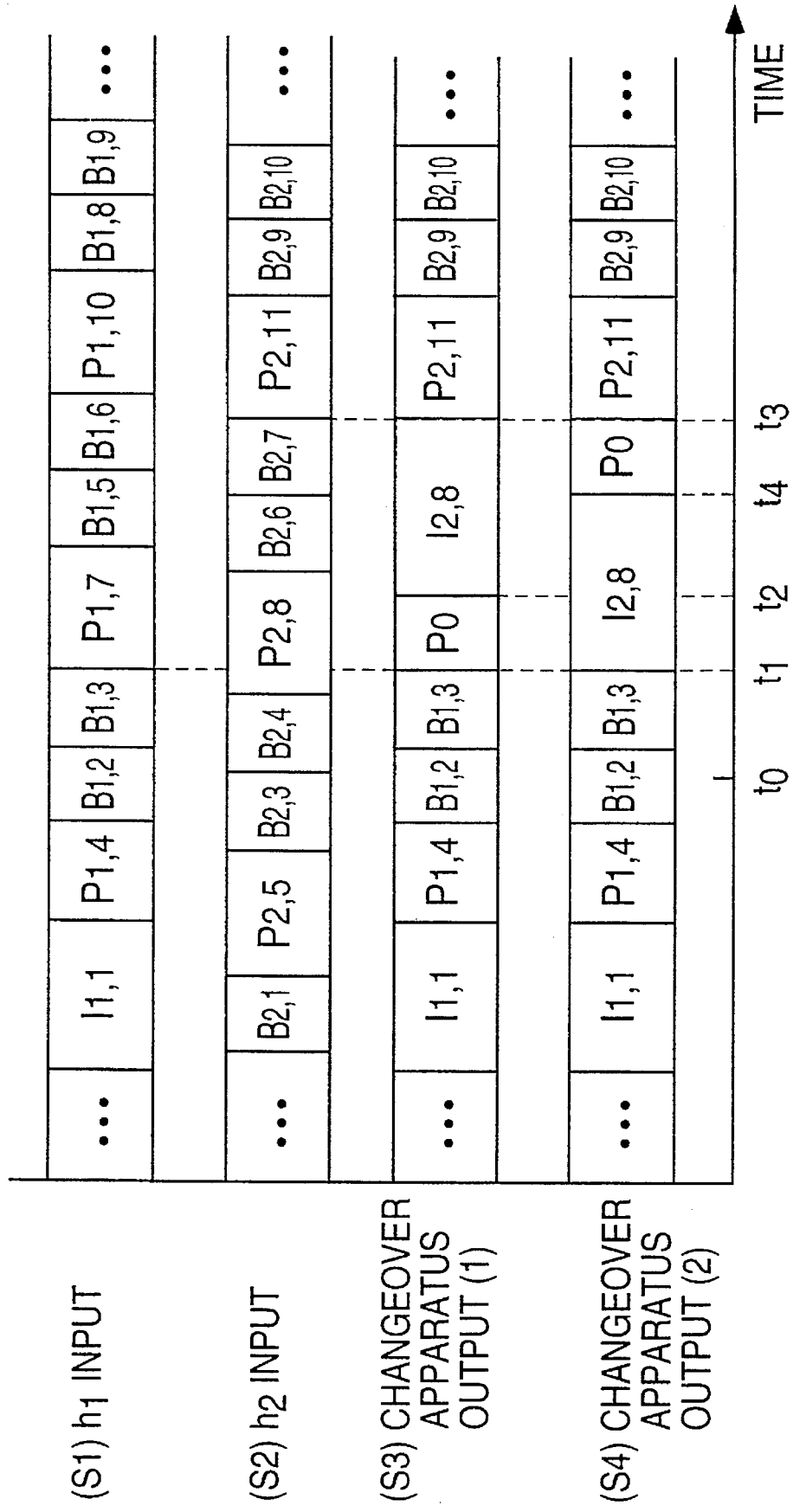
FIG. 12 is a diagram showing input and output signals of a switch of the moving picture compressed signal changeover apparatus In FIG. 11.

The operation of the moving picture compressed signal changeover apparatus in FIG. 9 is described. FIG. 12 shows the input and output signals of the moving picture compressed signal changeover apparatus, plotting the time on the axis of abscissas, in order to explain the changeover operation of the switch 404 of the moving picture compressed signal changeover apparatus in FIG. 11. As an example, herein, in order to explain the output of the moving picture compressed signal changeover apparatus the input and output signals of the switch 404 are shown at the time of changeover from the moving picture compressed signal entered into the input terminal $g_1$ to the moving picture compressed signal entered into the input terminal $g_2$, and the changeover operation of the switch 404 is described. in FIG. 12, $S_1$ denotes a moving picture compressed signal entered from the input terminal $g_1$ and put into the terminal $h_1$ of the switch 404 after passing through the delay circuit 4-1, $S_2$ denotes a moving picture compressed signal entered from the input terminal $g_2$ and output to the terminal $h_2$ of the switch 404 after passing through the delay circuit 4-2, and $S_3$ and $S_4$ denote moving picture compressed signals delivered from the switch 404, that is, the output signals of the moving picture compressed signal changeover apparatus. The frames and coding method in the diagram in FIG. 10 are same as in FIG. 4.

In this embodiment, first of all, the switch 404 is changed over from $h_1$ to $j_0$ at time $t_1$ when the signal immediately before the forward predictive coded frame $P_{1,7}$ is entered in terminal $h_1$, and the switch 404 delivers the predictive coded frame $P_0$ showing there is no difference from a previous frame delivered by the zero differential frame signal generating circuit 202. Consequently, the switch 404 is changed over from $j_0$ to $i_2$ at time $t_2$ when the intra-frame coding circuit 6-2 delivers a picture $I_{2,8}$ which is coded from a frame $P_{2,8}$ onto the intra-frame coded frame, and the frame $I_{2,8}$ is delivered from the switch 404. In succession, the switch 404 is changed over from $i_2$ to $h_2$ at time $t_3$ when the signal immediately before a boundary of a forward predictive coded frame $P_{2,11}$ is entered in the terminal $h_2$. As a result of this changeover, an output of the moving picture compressed signal changeover apparatus becomes $S_3$.

Or, at time $t_1$, by changing over the switch 404 from $h_1$ to $i_2$ to deliver the frame $I_{2,8}$ from the switch 404, and after changing over the switch 404 from $i_1$ to $j_0$ at time $t_4$ when the frame $I_{2,8}$ is entered into $i_2$ of the switch 404, the switch 404 may be changed over from $j_0$ to $h_2$ at time $t_3$. In this case, the output of the moving picture compressed signal changeover apparatus becomes $S_4$.

According to this changeover procedure, frames are reproduced after changeover earlier than in the moving picture compressed signal changeover apparatus shown in FIG. 3. Or, as compared with the moving picture compressed signal changeover apparatus shown in FIG. 7, since the quantity of data of the intra-frame coded frame delivered after changeover is not fixed, strict control of coding compression rate on the intra-frame coding circuit is not necessary.

Figure 13:
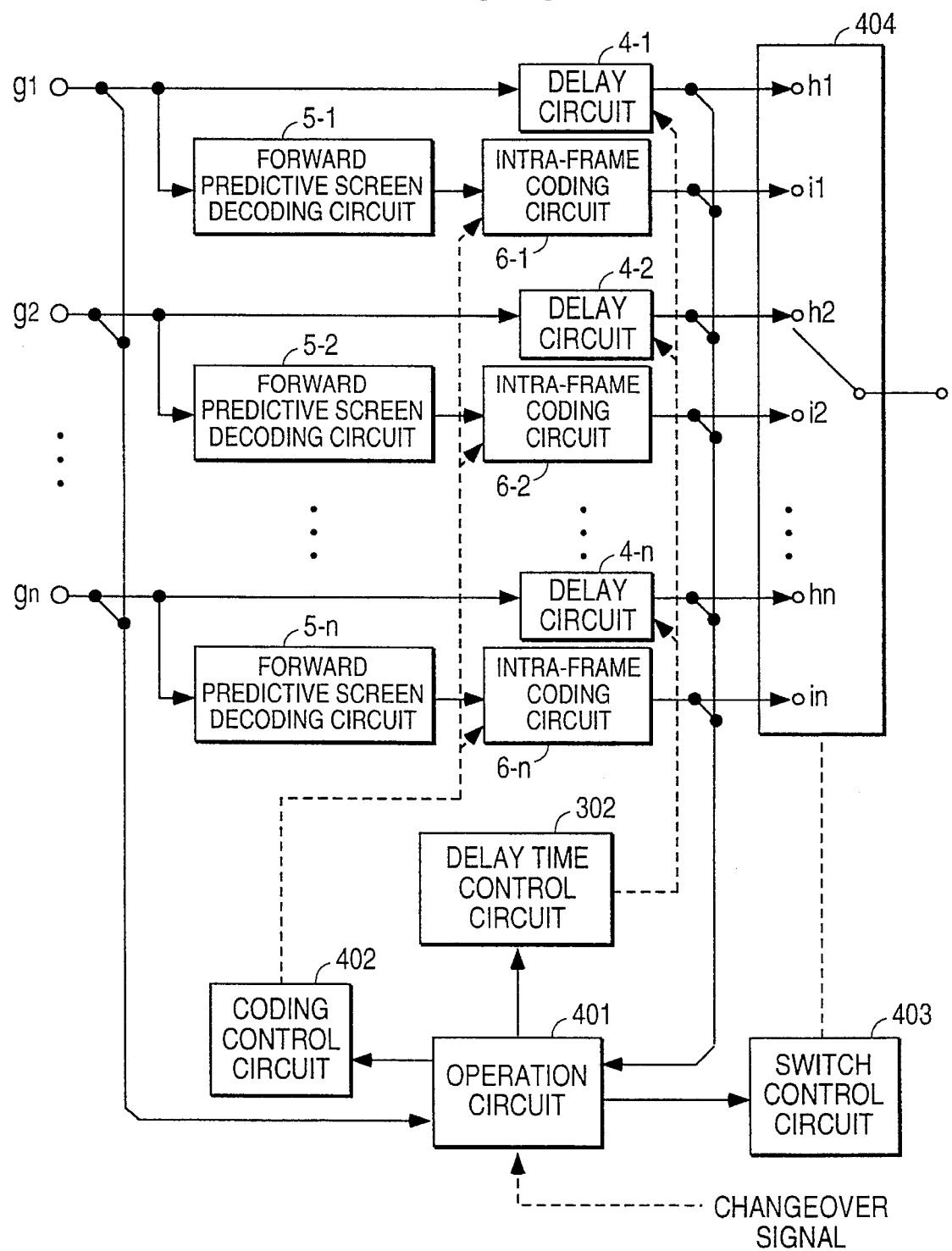
FIG. 13 is a block diagram of a moving picture compressed signal changeover apparatus in a seventh embodiment of the invention.

FIG. 13 is a block diagram of a moving picture compressed signal changeover apparatus in a seventh embodiment of the invention, in which the delay time of the delay circuits 4-1 to 4-n included in the moving picture compressed signal changeover apparatus shown in FIG. 7 may be changed by external control, the operation circuit 401 calculates each delay time of the delay circuits 4-1 to 4-n, the delay time control circuit 302 included in the embodiment shown in FIG. 5 is added, and each delay time of the delay circuits 4-1 to 4-n is controlled on the basis of the delay time calculated by the operation circuit 401.

Figure 14:
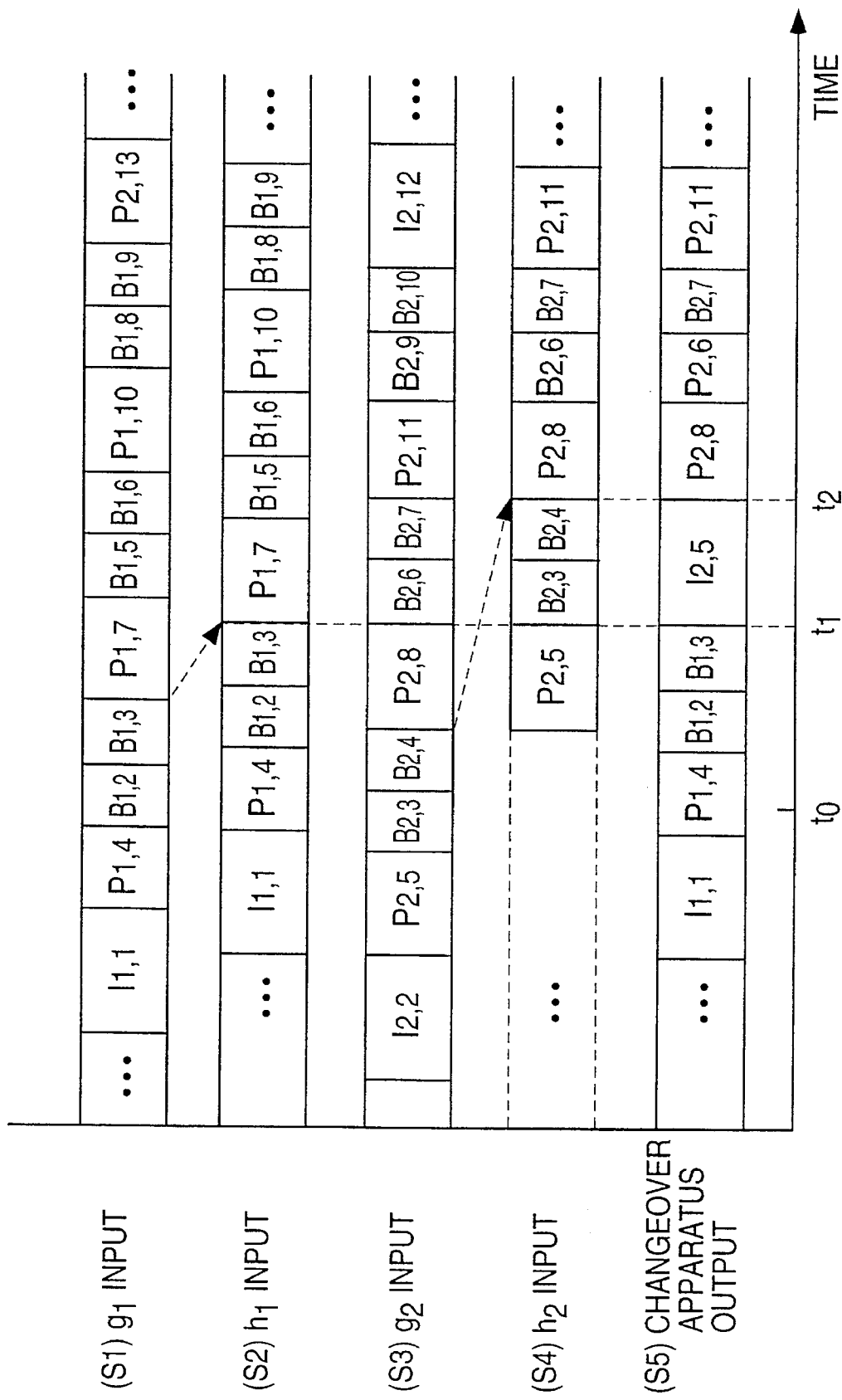
FIG. 14 is a diagram showing input and output signals of a switch of the moving picture compressed signal changeover apparatus in FIG. 13.

The operation of the embodiment is described. FIG. 14 shows input and output signals of the moving picture compressed signal changeover apparatus, plotting the time on the axis of abscissas, in order to explain the changeover operation of the switch 404 of the moving picture compressed signal changeover apparatus in FIG. 11. As an example, herein, in order to explain the output of the moving picture compressed signal changeover apparatus the input and output signals of the switch 404 are shown at the time of changeover from the moving picture compressed signal entered into the input terminal $g_1$ to the moving picture compressed signal entered into the input terminal $g_2$, and the changeover operation of the switch 404 is described. in FIG. 14, $S_1$ denotes a moving picture compressed signal entered from the input terminal $g_1$, $S_2$ denotes a moving picture compressed signal entered from the input terminal $g_1$ and put into the terminal $h_1$ of the switch 404 after passing through the delay circuit 4-1, $S_3$ denotes a moving picture compressed signal entered from the input terminal $g_2$, $S_4$ denotes the moving picture compressed signal after input of changeover signal entered from the input terminal $g_2$ and output to the terminal $h_2$ of the switch 404 after passing through the delay circuit 4-2, and $S_5$ denotes the moving picture compressed signal delivered from the switch 404, that is, an output signal of the moving picture compressed signal changeover apparatus. The frames and coding method in the diagram are same as in FIG. 2.

in this embodiment, first of all, the switch 404 is changed over from $h_1$ to $i_2$ at time $t_1$ when the signal immediately before the forward predictive coded frame $P_{1,7}$ is entered in terminal $h_1$, and the switch 404 delivers $I_{2,5}$ having $P_{1,5}$ intra-frame coded by the intra-frame coding circuit 6-2. in succession, the operation circuit 401 calculates the delay time of the delay circuit 4-2 so that the beginning signal of a frame $P_{2,5}$ which is a next forward predictive coded frame may be entered in the terminal $h_2$ immediately after the final signal of $I_{2,5}$ is entered in the terminal $i_2$, and the delay time control circuit 402 controls the delay time of the delay circuit 4-2 so as to operate on the delay time calculated by the operation circuit 401. At time $t_2$ when the beginning signal of the frame $P_{2,8}$ is entered in the terminal $h_2$, the switch 404 is changed over from $i_2$ to $h_2$. As a result of the changeover, the output of the moving picture compressed signal changeover apparatus becomes $S_5$.

According to this changeover procedure, delay fluctuations are smaller than in the moving picture compressed signal apparatus shown in FIG. 5, and the buffer amount required for delay is small. Or, as compared with the moving picture compressed signal changeover apparatus shown in FIG. 7, since the quantity of data of the intra-frame coded frame delivered after changeover is not fixed, strict control of coding compression rate on the intra-frame coding circuit is not necessary.

incidentally, the moving picture compressed signals entered in the foregoing embodiments of the invention are only examples for explaining the invention, and the composition of compression coded frame, such as the composition of intra-frame coded frame and forward predictive coded frame only, is not limited to the illustrated examples alone. Although the boundary of the frame is detected on the moving picture compressed signal entered from the input terminal in the embodiments, but it may be detected on the signal in the buffer of the delay circuit. Or, when converting the forward predictive coded frame into the intra-frame coded frame, all frames are once decoded before intra-frame coding, but the intra-frame coded portion in the forward predictive coded frame may be directly output. As the embodiments, examples of combining the fourth embodiment with the data signal generating circuit and the like are shown, but the third embodiment may be combined with the data signal generating circuit or zero differential picture signal generating circuit, and the type of combination are not limited to the illustrated embodiments alone.

What is claimed is:

1. A moving picture compressed signal changeover apparatus comprising:

a first input means for receiving a first moving picture compressed signal comprising a sequence of coded frames containing intra-frame coded frames, forward prediction coded frames and bidirectional prediction coded frames;

a second input means for receiving a second moving picture compressed signal comprising a sequence of coded frames containing intra-frame coded frames, forward prediction coded frames and bidirectional prediction coded frames; and a changeover means coupled to said first and second input means for selectively outputting one of said first and second moving picture compressed signals, said changeover means being responsive to an externally given changeover signal for changing over from said first moving picture compressed signal to said second moving picture compressed signal by connecting a frame of said first moving picture compressed signal occurring just before an intra-frame coded frame or a forward prediction coded frame of said first moving picture compressed signal to an intra-frame coded frame of said second moving picture compressed signal.

2. A moving picture compressed signal changeover apparatus comprising:

a first input means for receiving a first moving picture compressed signal comprising a sequence of coded frames containing intra-frame coded frames, forward prediction coded frames and bidirectional prediction coded frames;

a second input means for receiving a second moving picture compressed signal comprising a sequence of coded frames containing intra-frame coded frames, forward prediction coded frames and bidirectional prediction coded frames;

a signal generating means for generating a predetermined signal different from said first and second moving picture compressed signals; and a changeover means coupled to said first and second input means for selectively outputting one of said first and second moving picture compressed signals, said changeover means being responsive to an externally given changeover signal for changing over from said first moving picture compressed signal to said second moving picture compressed signal by first connecting a frame of said first moving picture compressed signal occurring just before an intra-frame coded frame or a forward prediction coded frame of said first moving picture compressed signal to said predetermined signal and thereafter connecting said predetermined signal to an intra-frame coded frame of said second moving picture compressed signal.

3. An apparatus according to claim 2, wherein said predetermined signal is a signal which does not affect a decoding processing performed at a decoder for decoding said first and second moving picture compressed signals.

4. An apparatus according to claim 2, wherein said predetermined signal is a signal which shows that a frame occurring during occurrence of said predetermined signal has no difference from a previously occurring frame.

5. A moving picture compressed signal changeover apparatus comprising:

a first input means for receiving a first moving picture compressed signal comprising a sequence of coded frames containing intra-frame coded frames, forward prediction coded frames and bidirectional prediction coded frames;

a first delay means coupled to said first input means for delaying said first moving picture compressed signal to obtain a delayed first moving picture compressed signal;

a second input means for receiving a second moving picture compressed signal comprising a sequence of coded frames containing intra-frame coded frames, forward prediction coded frames and bidirectional prediction coded frames;

a second delay means coupled to said second input means for delaying said second moving picture compressed signal to obtain a delayed second moving picture compressed signal;

a changeover means coupled to said first and second delay means for selectively outputting one of said delayed first and second moving picture compressed signals, said changeover means being responsive to an externally given changeover signal for changing over from said delayed first moving picture compressed signal to said delayed second moving picture compressed signal by connecting a frame of said delayed first moving picture compressed signal occurring just before an intra-frame coded frame or a forward prediction coded frame of said delayed first moving picture compressed signal to an intra-frame coded frame of said delayed second moving picture compressed signal; and a delay control means for controlling at least one of said first and second delay means such that said frame of said delayed first moving picture compressed signal occurring just before said intra-frame coded frame or said forward prediction coded frame of said delayed first moving picture compressed signal occurs at a timing just before said intra-frame coded frame of said delayed second moving picture compressed signal.

6. A moving picture compressed signal changeover apparatus comprising:

a first input means for receiving a first moving picture compressed signal comprising a sequence of coded frames containing intra-frame coded frames, forward prediction coded frames and bidirectional prediction coded frames;

a second input means for receiving a second moving picture compressed signal comprising a sequence of coded frames containing intra-frame coded frames, forward prediction coded frames and bidirectional prediction coded frames;

a decoding means coupled to said second input means for decoding said forward prediction coded frames in said first moving picture compressed signal to obtain decoded frames;

an intra-frame encoding means for intra-frame encoding each of said decoded frames to obtain a new intra-frame coded frame; and a changeover means coupled to said first and second input means for selectively outputting one of said first and second moving pictures compressed signal, said changeover means being responsive to an externally given changeover signal for changing over from said first moving picture compressed signal to said second moving picture compressed signal by first connecting a frame of said first moving picture compressed signal occurring just before an intra-frame coded frame or a forward prediction coded frame of said first moving picture compressed signal to said new intra-frame coded frame and then connecting said new intra-frame frame coded frame to an intra-frame coded frame of said second moving picture compressed signal.

7. An apparatus according to claim 6, further comprising:

a first delay means coupled to said first input means for delaying said first moving picture compressed signal to obtain a delayed first moving picture compressed signal; and a second delay means coupled to said second input means for delaying said second moving picture compressed signal to obtain a delayed second moving picture compressed signal, wherein said changeover means is coupled to said first and second delay means for selectively outputting one of said delayed first and second moving picture compressed signals, said changeover means being responsive to said externally given changeover signal for changing over from said delayed first moving picture compressed signal to said delayed second moving picture compressed signal by first connecting a frame of said delayed first moving picture compressed signal occurring just before an intra-frame coded frame or a forward prediction coded frame of said delayed first moving picture compressed signal to said new intra-coded frame and then connecting said new intra-coded frame to an intra-frame coded frame of said delayed second moving picture compressed signal, and wherein said changeover means includes a delay control means for controlling at least one of said first and second delay means so as to adjust a timing at which said frame of said delayed first moving picture compressed signal occurring just before said intra-frame coded frame or said forward prediction coded frame of said delayed first moving picture compressed signal is connected to said new intra-frame coded frame and a timing at which said new intra-frame coded frame is connected to said intra-frame coded frame of said delayed second moving picture compressed signal.

8. An apparatus according to claim 6, further comprising a signal generating means for generating a predetermined signal different from said first and second moving picture compressed signals, wherein said changeover means, when changing over from said first moving picture compressed signal to said second moving picture compressed signal, inserts said predetermined signal between said frame of said first moving picture compressed signal occurring just before an intra-frame coded frame or a forward prediction coded frame of said first moving picture compressed signal and said new intra-frame coded frame.

9. An apparatus according to claim 8, wherein said predetermined signal is a signal which does not affect a decoding processing performed at a decoder for decoding said first and second moving picture compressed signal.

10. An apparatus according to claim 8, wherein said predetermined signal is a signal which shows that a frame occurring during occurrence of said predetermined signal has no difference from a previously occurring frame.

11. An apparatus according to claim 6, further comprising a signal generating means for generating a predetermined signal different from said first and second moving picture compressed signals, wherein said changeover means, when changing over from said first moving picture compressed signal to said second moving picture compressed signal, inserts said predetermined signal between said new intra-frame coded frame and said intra-frame coded frame of said second moving picture compressed signal.

12. An apparatus according to claim 10, wherein said predetermined signal is a signal which does not affect a decoding processing performed at a decoder for decoding said first and second moving picture compressed signals.

13. An apparatus according to claim 11, wherein said predetermined signal is a signal which shows that a frame occurring during occurrence of said predetermined signal has no difference from a previously occurring frame.

* * * * *